US011258893B2

(12) United States Patent
Liu

(10) Patent No.: US 11,258,893 B2
(45) Date of Patent: Feb. 22, 2022

(54) METHOD FOR PROMPTING NOTIFICATION MESSAGE AND MOBILE TERMINAL

(71) Applicant: VIVO MOBILE COMMUNICATION CO., LTD., Chang'an Dongguan (CN)

(72) Inventor: Zhaohui Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/759,607

(22) PCT Filed: Oct. 19, 2018

(86) PCT No.: PCT/CN2018/111038
§ 371 (c)(1),
(2) Date: Apr. 27, 2020

(87) PCT Pub. No.: WO2019/080775
PCT Pub. Date: May 2, 2019

(65) Prior Publication Data
US 2020/0280628 A1 Sep. 3, 2020

(30) Foreign Application Priority Data
Oct. 25, 2017 (CN) .......................... 201711007298.9

(51) Int. Cl.
*H04W 68/02* (2009.01)
*H04M 1/7243* (2021.01)
(Continued)

(52) U.S. Cl.
CPC ..... *H04M 1/7243* (2021.01); *H04M 1/72448* (2021.01); *H04M 1/72484* (2021.01); *H04W 68/02* (2013.01)

(58) Field of Classification Search
CPC combination set(s) only.
See application file for complete search history.

(56) References Cited

U.S. PATENT DOCUMENTS

2006/0111093 A1 5/2006 Shim et al.
2020/0042171 A1* 2/2020 Tao ........................ G06F 3/0484
(Continued)

FOREIGN PATENT DOCUMENTS

| CN | 103248757 A | 8/2013 |
| CN | 104049847 A | 9/2014 |

(Continued)

OTHER PUBLICATIONS

Extended European Search Report for related Application No. 18871496.8; dated Nov. 13, 2020.
(Continued)

*Primary Examiner* — Julio R Perez
(74) *Attorney, Agent, or Firm* — von Briesen & Roper, s.c.

(57) ABSTRACT

A method for prompting a notification message, and a mobile terminal are provided. The method includes: receiving a notification message; determining whether a floating notification display area of a display screen of the mobile terminal is in an operated state or a to-be-operated state; the floating notification display area is an area whose distance from a status bar of the mobile terminal is less than or equal to a target value; in a case that the floating notification display area is the an operated or to-be-operated state, determining whether the notification message needs to be prompted; and in a case that that the notification message needs to be prompted, prompting the notification message by using a target prompting manner corresponding to the notification message, in a case that the notification message needs to be prompted.

20 Claims, 6 Drawing Sheets

(51) Int. Cl.
*H04M 1/72448* (2021.01)
*H04M 1/72484* (2021.01)

(56) References Cited

U.S. PATENT DOCUMENTS

| | | | | |
|---|---|---|---|---|
| 2020/0280628 | A1* | 9/2020 | Liu | H04L 51/24 |
| 2020/0359425 | A1* | 11/2020 | Chen | H04W 4/12 |
| 2020/0371668 | A1* | 11/2020 | Huang | G06K 9/00013 |
| 2021/0058849 | A1* | 2/2021 | Zheng | H04W 48/10 |
| 2021/0136663 | A1* | 5/2021 | Liu | H04W 80/00 |

FOREIGN PATENT DOCUMENTS

| | | |
|---|---|---|
| CN | 105045468 A | 11/2015 |
| CN | 105786469 A | 7/2016 |
| CN | 106354363 A | 1/2017 |
| CN | 107734175 A | 2/2018 |
| EP | 2618626 A1 | 7/2013 |

OTHER PUBLICATIONS

International Search Report & Written Opinion related to Application No. PCT/CN2018/111038; dated Dec. 29, 2018.

\* cited by examiner

METHOD FOR PROMPTING NOTIFICATION MESSAGE AND MOBILE TERMINAL

CROSS-REFERENCE TO RELATED APPLICATION

This application is the U.S. national phase of PCT Application No. PCT/CN2018/111038 filed on Oct. 19, 2018, which claims a priority to Chinese Patent Application No. 201711007298.9 filed on Oct. 25, 2017, the disclosures of which are incorporated in their entire by reference herein.

TECHNICAL FIELD

The present disclosure relates to the field of communication technologies, and in particular to a method for prompting a notification message and a mobile terminal.

BACKGROUND

With increasing popularity of smart phones and increasing convenience that smart phones bring to our lives and work, more and more applications are installed on our phones. Various kinds of news, such as chat messages and advertising recommendations, will be displayed at the top of a screen of the phone in a floating manner. A user can set notifications for certain applications not to be displayed or notifications may be displayed based on priorities of the applications, etc., however, notifications that the user does not want to intercept may cause, in some scenarios, interference to the user using the mobile phone, reducing user experience.

Specifically, in the process of the user using the smart phone, the floating notifications which the user does not want to intercept degrade the user experience in scenarios including but not limited to the following:

(1) When operating the top area of the screen of the mobile phone, such as making a call or global search, if the floating notification suddenly pops up, it will affect the current transaction processing of the user. The user needs to choose to wait for the floating notification to automatically disappear before operating, or the user removes the floating notification proactively before operating.

(2) When viewing the content in the top area of the screen of the mobile phone, such as using global search to enter content, if the floating notification suddenly pops up, it will affect the interface display. The user may choose to wait for the floating notification to automatically disappear before operating, or the user removes the floating notification proactively before operating.

For the above scenarios, there are mainly the following defects:

The floating notification is displayed for a relatively long time. If the user waits for the floating notification to disappear automatically, the user experience will be degraded; if the user proactively removes the notification, the current transaction processing of the user will be disturbed; and mistakenly touching may be easily caused by the floating notification and thus the application to which the notification belongs will be entered, in which case the current affair of the user is interrupted and the user experience is greatly degraded.

SUMMARY

A method for prompting a notification message, applied to a mobile terminal, is provided, which includes:

receiving a notification message;

determining whether a floating notification display area of a display screen of the mobile terminal is in an operated state or a to-be-operated state, where the floating notification display area is an area whose distance from a status bar of the mobile terminal is less than or equal to a target value;

determining whether the notification message needs to be prompted, in a case that the floating notification display area is in the operated state or the to-be-operated state; and prompting the notification message by using a target prompting manner corresponding to the notification message, in a case that the notification message needs to be prompted.

Embodiments of the present disclosure further provide a mobile terminal, including:

a receiving module, configured to receive a notification message;

a first determining module, configured to determine whether a floating notification display area of a display screen of the mobile terminal is in an operated state or a to-be-operated state, wherein the floating notification display area is an area whose distance from a status bar of the mobile terminal is less than or equal to a target value;

a second determining module, configured to determine whether the notification message needs to be prompted in a case that the floating notification display area is in the operated state or the to-be-operated state; and a prompting module, configured to prompt the notification message by using a target prompting manner corresponding to the notification message in a case that the notification message needs to be prompted.

Embodiments of the present disclosure further provide a mobile terminal, including a processor, a memory, and a computer program stored on the memory and executable by the processor. When the computer program is executed by the processor, steps of the above method for prompting the notification message are implemented.

Embodiments of the present disclosure further provide a computer-readable storage medium, having a computer program store thereon. When the computer program is executed by a processor, steps of the above method for prompting the notification message are implemented.

BRIEF DESCRIPTION OF THE DRAWINGS

In order to illustrate technical solutions of embodiments of the present disclosure more clearly, the drawings used in the descriptions of the embodiments of the present disclosure are briefly introduced hereinafter. Apparently, the drawings in the following descriptions are merely some embodiments of the present disclosure. For those skilled in the art, other drawings can be obtained based on these drawings without any creative efforts.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

Figure 1:
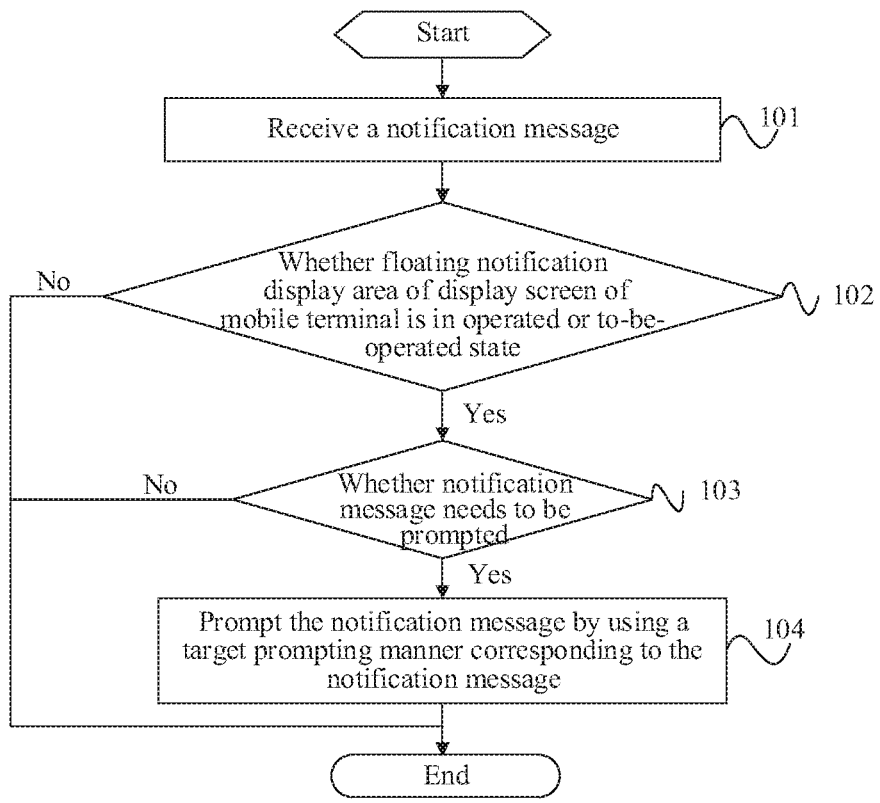
FIG. 1 is a flowchart of steps of a method for prompting a notification message provided by embodiments of the present disclosure.

As shown in FIG. 1, embodiments of the present disclosure provide a method for prompting a notification message, which is applied to a mobile terminal and includes:

Step 101: receiving a notification message.

In this step, the notification message mainly includes a message received by an application installed on the mobile terminal; for example, a message sent by a WeChat friend, a message pushed by a WeChat public account, etc., which are not enumerated herein.

Step 102: determining whether a floating notification display area of a display screen of the mobile terminal is in an operated state or a to-be-operated state. The floating notification display area is an area whose distance from a status bar of the mobile terminal that is less than or equal to a target value.

In this step, the target value may be set in advance, which may be dynamically changed, or may be a fixed value, which is not specifically limited herein. The floating notification display area is specifically the area at the top of the mobile terminal. Generally, the range of the floating notification display area is larger than the range of the status bar of the mobile terminal, and the floating notification display area includes the area of the status bar of the mobile terminal.

Step 103: in a case that the floating notification display area is in an operated state or a to-be-operated state, determining whether the notification message needs to be prompted.

In this step, in a case that the floating notification display area is neither in the operated state nor in the to-be-operated state, the notification message is displayed or prompted according to the display manner or the prompting manner in the related technologies; which is not described herein.

Step 104: in a case that the notification message needs to be prompted, prompting the notification message by using a target prompting manner corresponding to the notification message.

In this step, in a case that the notification message does not need to be prompted, the notification message is not currently prompted; the user can be notified of the notification message when the user clicks on the application that generates the notification message; or, when the user does not operate the floating notification display area or after there is no trend of operating the floating notification display area in the subsequent, the notification message is displayed in a floating manner according to the display manner of the floating notification in the related technologies; which is not described in detail herein.

In the above embodiments of the present disclosure, the floating notification display area on the display screen of the mobile terminal being in the operated state, specifically refers to that the user is currently operating an area near the top of the mobile phone; the floating notification display area on the display screen of the mobile terminal being in the to-be-operated state, specifically refers to that the user has a tendency to operate the area near the top of the mobile phone. In the above scenarios, the method for prompting the notification message provided by the embodiments of the present disclosure automatically switches prompting manners for the notification message, so that the notification message is displayed or the user is notified that a new message arrives, without disturbing the transaction currently being processed by the user, thereby improving user experience, and showing different notification display forms to further improve the user experience.

Further, step 102 in the above embodiments of the present disclosure includes:

determining whether the floating notification display area of the display screen of the mobile terminal is in the operated state or the to-be-operated state, according to a historical touch track of a user of the mobile terminal on the display screen.

Specifically, before this step, the mobile terminal needs to record the area where the user touches the screen during the use of the mobile phone and the screen touch area of the user in a previous period, so as to obtain the historical touch track of the user of the mobile terminal on the display screen. By analyzing the historical touch track, it can be determined whether the user is operating the floating notification display area or whether the user has a tendency to operate the floating notification display area.

And/or, whether the floating notification display area of the display screen of the mobile terminal is in the operated state or the to-be-operated state is determined according to a gesture of the user of the mobile terminal for holding the mobile terminal.

And/or, whether the floating notification display area of the display screen of the mobile terminal is in the operated state or the to-be-operated state is determined according to pupil gaze information of the user of the mobile terminal.

In the above embodiments of the present disclosure, the historical touch track, the gesture of holding the mobile terminal, and/or the pupil gaze information are factors for determining whether the floating notification display area is in the operated state or the to-be-operated state. Different accuracies can be obtained based on different factors. When comprehensive determination is made based on two or more factors, accuracy of determination can be improved.

Specifically, the step of determining whether the floating notification display area of the display screen of the mobile terminal is in the operated state or the to-be-operated state according to the gesture of the user of the mobile terminal for holding the mobile terminal includes:

in a case that the gesture of the user of the mobile terminal for holding the mobile terminal indicates that the user of the mobile terminal is capable of touching the floating notification display area, determining that the floating notification display area is in the operated state or the to-be-operated state; otherwise, determining that the floating notification display area is not in the operated state or the to-be-operated state.

The gesture of the user of the mobile terminal for holding the mobile terminal may be detected by a sensor on the back cover of the mobile terminal. In a case that the user's finger mainly touches the middle or upper area of the mobile phone, it means that the user is capable of touching the floating notification display area, and it is further determined that the user has a tendency to operate the floating notification display area.

Specifically, the step of determining whether the floating notification display area of the display screen of the mobile terminal is in the operated state or the to-be-operated state according to the pupil gaze information of the user of the mobile terminal includes:

in a case that an area where a pupil of the user of the mobile terminal gazes overlaps with the floating notification display area, determining that the floating notification display area is in the operated state or the to-be-operated state; otherwise, determining that the floating notification display area is not in the operated state or to-be-operated state.

A front camera is used to monitor the area where the pupil of the user gazes at the current time, and it may be determined whether the floating notification display area is in the operated state or the to-be-operated state according to the gazed area.

It should be noted that in the above embodiments of the present disclosure, any one of the factors of the historical touch track, the gesture for holding the mobile terminal, and the pupil gaze information may be used to determine whether the floating notification display area of the display screen of the mobile terminal is in the operated state or the to-be-operated state; or, any two or more factors of the historical touch track, the gesture for holding the mobile terminal, and the pupil gaze information may be used to determine whether the floating notification display area of the display screen of the mobile terminal is in the operated state or the to-be-operated state, which is not specifically limited herein.

If any two or more factors in the historical touch track, the gesture for holding the mobile terminal, and the pupil gaze information are used to determine whether the floating notification display area of the display screen of the mobile terminal is in the operated state or the to-be-operated state, different weight values may be set for the factors. Whether the floating notification display area of the display screen of the mobile terminal is in the operated state or the to-be-operated state may be determined according to a weighted result of different weight values. For example, a boundary value of M is set, and if the weighted result is greater than M, the floating notification display area of the display screen of the mobile terminal is in the operated state or the to-be-operated state; and if the weighting result is less than M, the floating notification display area of the display screen of the mobile terminal is not in the operated state or the to-be-operated state.

Further, step 103 in the above embodiments of the present disclosure includes:

in a case that the notification message is a third type of message, determining that the notification message does not need to be prompted; otherwise, determining that the notification message needs to be prompted.

The third type of message is an unimportant notification, such as update messages of some public accounts. The type of the notification message may be determined by setting keywords in advance, which is not described in detail herein. Unimportant notifications are not prompted, so that interference with the current operation of the user can be avoided to the greatest extent, which further improves the user experience.

Step 104 includes:

controlling content of the notification message to be displayed in a form of bullet comments at a first target location of the display screen of the mobile terminal, in a case that the notification message is a first type of message; where the bullet comments are non-clickable, and the purpose is that the interface display or user operation is not affected; the content of the notification message is displayed in the form of bullet comments, which can not only display the currently arrived notification message, but also ensure that the transaction currently being processed by the user is not disturbed;

controlling, an icon of an application to which the notification message belongs, to be displayed at a second target location of the display screen of the mobile terminal, in a case that the notification message is a second type of message. Only the icon of the application is displayed, the user is reminded by the icon of the application that a new notification message arrives in the application corresponding to the icon, and the notification content is not displayed, which can also ensure that the transaction currently being processed by the user is not disturbed.

In the above embodiments of the present disclosure, the determination of the type of the notification message may be determined according to preset keyword content. For example, in a case that the notification message includes the preset keyword content, the notification message is the first type of message; and in a case that the notification message does not include the preset keyword content, the notification message is the second type of message.

Further, in the above embodiments of the present disclosure, the step of, in a case that the notification message is the first type of message, controlling the content of the notification message to be displayed in the form of bullet comments at the first target location of the display screen of the mobile terminal includes:

in a case that the notification message is the first type of message, and the mobile terminal is in a non-full-screen display state or the mobile terminal is in a full-screen display state but currently displayed information of a location where the status bar of the mobile terminal is located does not comprise preset information, controlling the content of the notification message to be displayed in the form of bullet comments at the location where the status bar of the mobile terminal is located.

Figure 2:
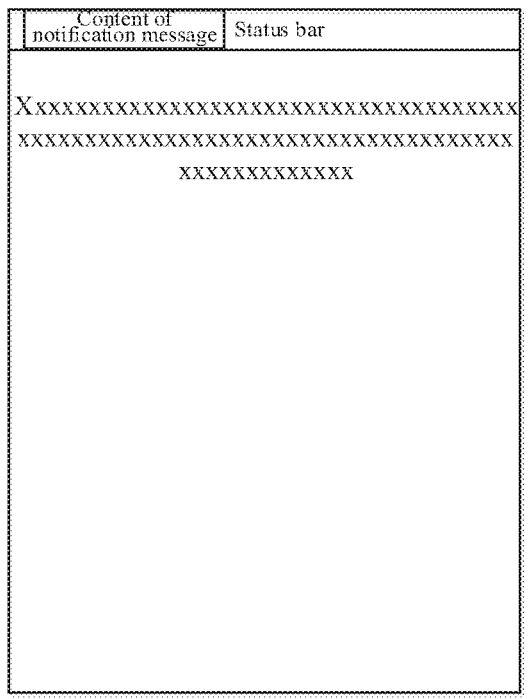
FIG. 2 is a first display schematic diagram of a display screen of a mobile terminal in a method for prompting a notification message provided by embodiments of the present disclosure.
Figure 3:
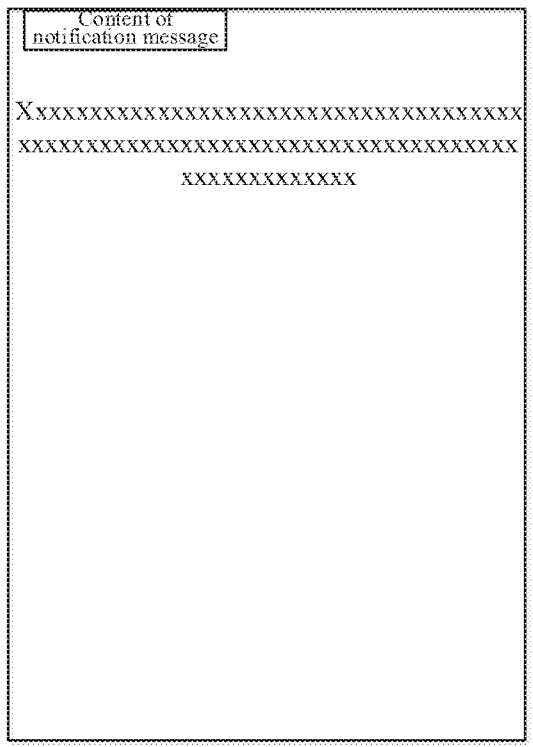
FIG. 3 is a second display schematic diagram of a display screen of a mobile terminal in a method for prompting a notification message provided by embodiments of the present disclosure.

As shown in FIG. 2, the mobile terminal is currently in a non-full-screen display state, and the content of the notification message floats through the status bar in the form of bullet comments; as shown in FIG. 3, the mobile terminal is currently in a full-screen display state, the currently displayed information of the location where the status bar of the mobile terminal is located does not include preset information, and the content of the notification message floats through the status bar in the form of bullet comments.

Or, in a case that the notification message is the first type of message, the mobile terminal is in a full-screen display state and currently displayed information of a location where the status bar of the mobile terminal is located include the preset information, the content of the notification message is controlled to be displayed in the form of bullet comments at other area of the display screen of the mobile terminal other than the floating notification display area.

Figure 4:
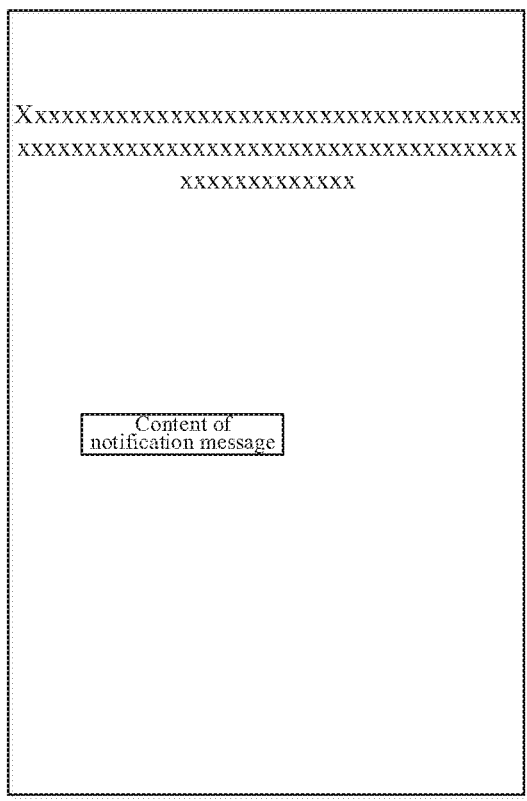
FIG. 4 is a third display schematic diagram of a display screen of a mobile terminal in a method for prompting a notification message provided by embodiments of the present disclosure.

As shown in FIG. 4, the mobile terminal is currently in a full-screen display state, the currently displayed information of the location of the status bar of the mobile terminal includes the preset information, and the content of the notification message floats across other area other than the floating notification display area in the form of bullet comments.

Further, in the above embodiments of the present disclosure, the step of, in a case that the notification message is the second type of message, controlling, the icon of the application to which the notification message belongs, to be displayed at the second target location of the display screen of the mobile terminal, include:

in a case that the notification message is the second type of message, and the mobile terminal is in a non-full-screen display state or the mobile terminal is in a full-screen display state but there is a continuous blank area at a location where the status bar of the mobile terminal is located, controlling, the icon of the application to which the notification message belongs, to be displayed in a floating manner for a preset period of time on the blank area at the location where the status bar is located.

Figure 5:
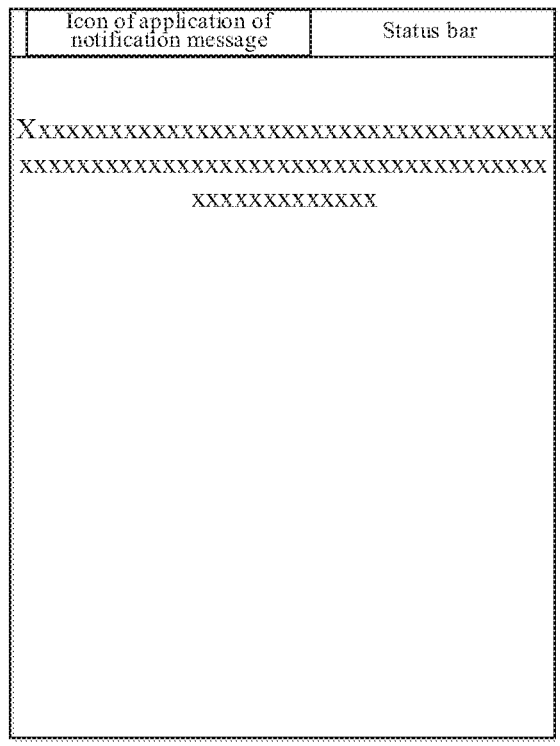
FIG. 5 is a fourth display schematic diagram of a display screen of a mobile terminal in a method for prompting a notification message provided by embodiments of the present disclosure.
Figure 6:
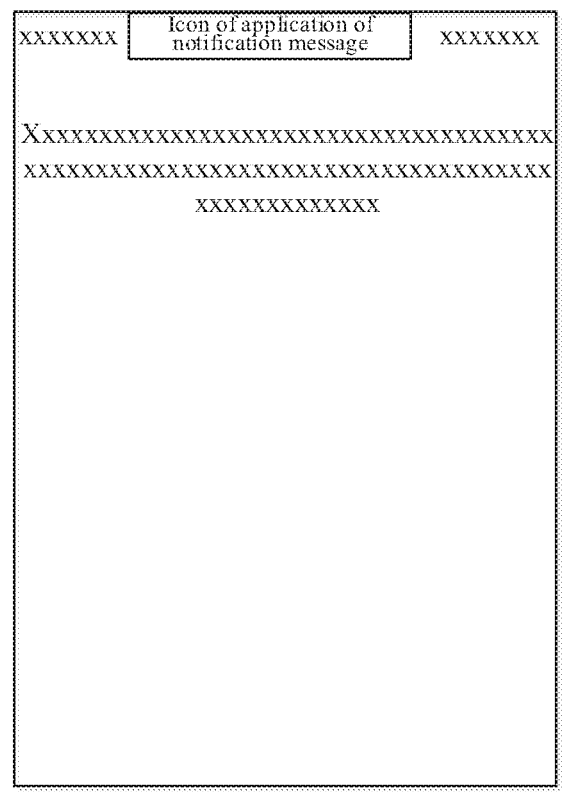
FIG. 6 is a fifth display schematic diagram of a display screen of a mobile terminal in a method for prompting a notification message provided by embodiments of the present disclosure.

As shown in FIG. 5, the mobile terminal is currently in a non-full-screen display state, and the icon of the application to which the notification message belongs is displayed in a floating manner on the status bar for the preset period of time; as shown in FIG. 6, the mobile terminal is currently in a full-screen display state, there is a continuous blank area at the location where the status bar is located, and the icon of the application to which the notification message belongs is displayed in a floating manner on the blank area of the status bar for the preset period of time.

Or, in a case that the notification message is the second type of message, the mobile terminal is in a full-screen display state and there is no continuous blank area at a location where the status bar of the mobile terminal is located, the icon of the application to which the notification message belongs is controlled to be displayed in a floating manner for a preset period of time on other area of the display screen of the mobile terminal other than the floating notification display area.

Figure 7:
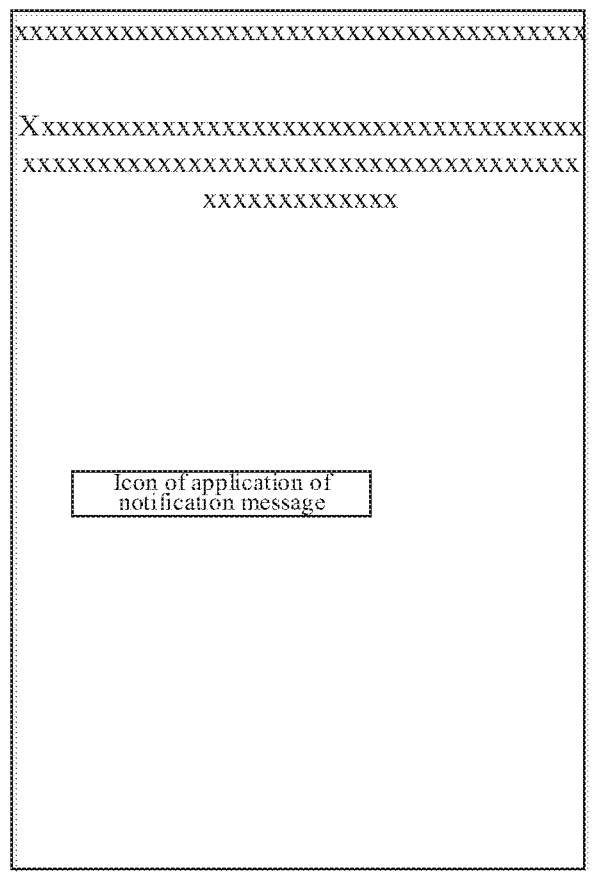
FIG. 7 is a sixth display schematic diagram of a display screen of a mobile terminal in a method for prompting a notification message provided by embodiments of the present disclosure.

As shown in FIG. 7, the mobile terminal is currently in a full-screen display state, there is no continuous blank area at the location where the status bar is located, and the icon of the application to which the notification message belongs is displayed in a floating manner in an area other than the floating notification display area for a preset period of time.

It should be noted that the "xxxx" area in FIGS. 2 to 7 specifically refers to an area where important information is displayed or a current operating area of the user or an area currently concerned by the user, and to avoid repetition, details are not described again.

In summary, in the above embodiments of the present disclosure, when the floating notification display area of the display screen of the mobile terminal is in the operated state or the to-be-operated state, and if the notification message is received and needs to be prompted, the target prompting manner corresponding to the notification message is determined based on the notification message, and the notification message is prompted with the target prompting manner. The target prompting manner includes displaying the content of the notification message in the form of bullet comments and displaying in a floating manner an icon of an application to which the notification message belongs. Without disturbing the transaction currently processed by the user, the notification message can be displayed or the user can be reminded that a new message arrives based on the method, which improves the user experience; in addition, different notification display forms can be shown, which further improves the user experience.

Figure 8:
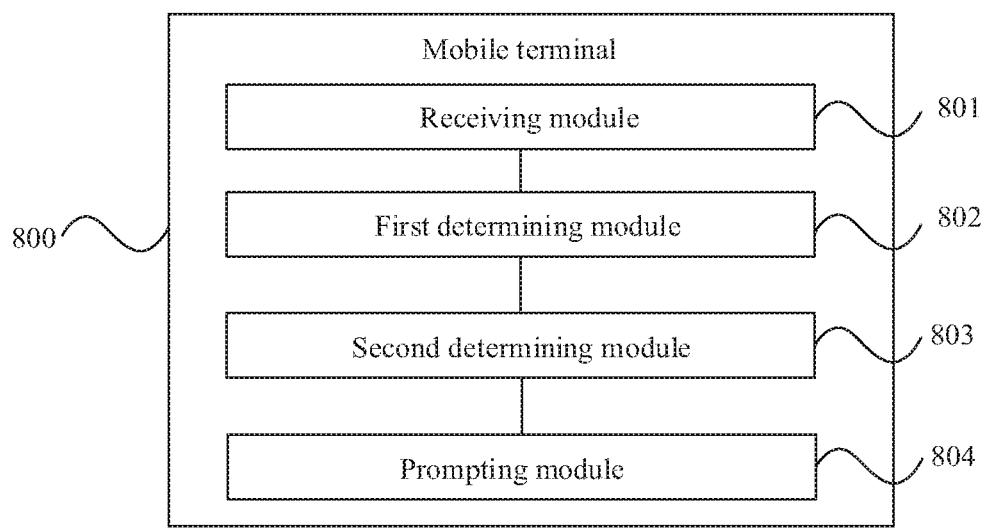
FIG. 8 is a first structural schematic diagram of a mobile terminal provided by the embodiments of the present disclosure.

As shown in FIG. 8, embodiments of the present disclosure further provide a mobile terminal 800, including:

a receiving module 801, configured to receive a notification message;

a first determining module 802, configured to whether a floating notification display area of a display screen of the mobile terminal is in an operated state or a to-be-operated state, wherein the floating notification display area is an area whose distance from a status bar of the mobile terminal is less than or equal to a target value;

a second determining module 803, configured to determine whether the notification message needs to be prompted in a case that the floating notification display area is in the operated state or the to-be-operated state; and a prompting module 804, configured to prompt the notification message by using a target prompting manner corresponding to the notification message in a case that the notification message needs to be prompted.

Figure 9:
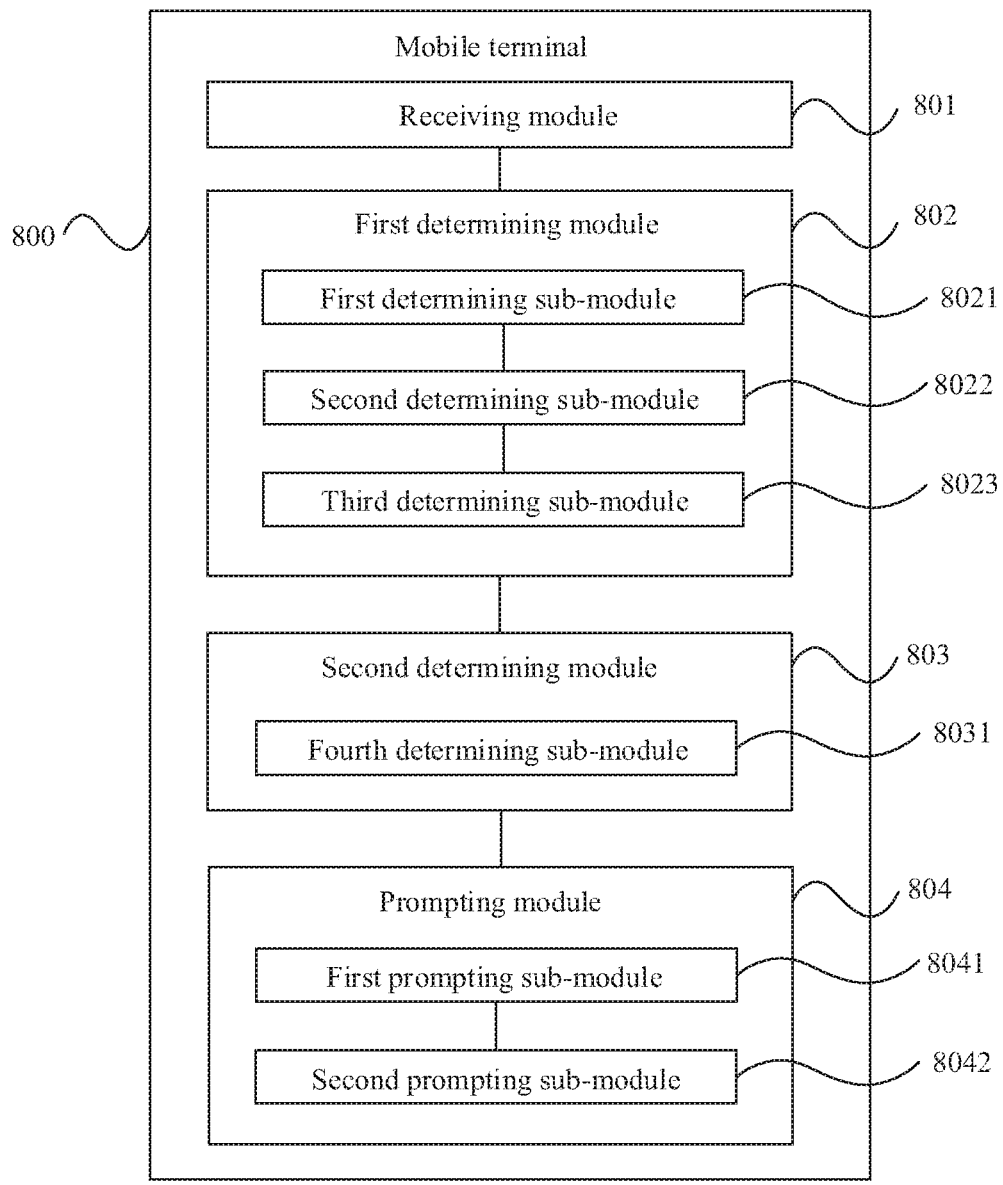
FIG. 9 is a second structural schematic diagram of a mobile terminal provided by embodiments of the present disclosure.

Further, as shown in FIG. 9, the first determining module 802 in the embodiments of the present disclosure includes:

a first determining sub-module 8021, configured to determine whether the floating notification display area of the display screen of the mobile terminal is in the operated state or the to-be-operated state according to a historical touch track of a user of the mobile terminal on the display screen; and/or, a second determining sub-module 8022, configured to determine whether the floating notification display area of the display screen of the mobile terminal is in the operated state or the to-be-operated state according to a gesture of the user of the mobile terminal for holding the mobile terminal; and/or, a third determining sub-module 8023, configured to determine whether the floating notification display area of the display screen of the mobile terminal is in the operated state or the to-be-operated state according to pupil gaze information of the user of the mobile terminal.

Further, as shown in FIG. 9, the second determining sub-module 8022 in the embodiments of the present disclosure includes:

a first determining unit, configured to: in a case that the gesture of the user of the mobile terminal for holding the mobile terminal indicates that the user of the mobile terminal is capable of touching the floating notification display area, determine that the floating notification display area is in the operated state or the to-be-operated state; otherwise, determine that the floating notification display area is not in the operated state or the to-be-operated state.

Further, the third determining sub-module 8023 in the embodiments of the present disclosure includes:

a second determining unit, configured to: in a case that an area where a pupil of the user of the mobile terminal gazes overlaps with the floating notification display area, determine that the floating notification display area is in the operated state or the to-be-operated state; otherwise, determine that the floating notification display area is not in the operated state or to-be-operated state.

Further, as shown in FIG. 9, the second determining module 803 in the embodiments of the present disclosure includes:

a fourth determining sub-module 8031, configured to: in a case that the notification message is a third type of message, determine that the notification message does not need to be prompted; otherwise, determine that the notification message needs to be prompted.

Further, as shown in FIG. 9, the prompting module 804 in the embodiments of the present disclosure includes:

a first prompting sub-module 8041, configured to control content of the notification message to be displayed in a form of bullet comments at a first target location of the display screen of the mobile terminal, in a case that the notification message is a first type of message; and a second prompting sub-module 8042, configured to control, an icon of an application to which the notification message belongs, to be displayed at a second target location of the display screen of the mobile terminal, in a case that the notification message is a second type of message.

Further, the first prompting sub-module 8041 in the embodiments of the present disclosure includes:

a first prompting unit, configured to: in a case that the notification message is the first type of message, and the mobile terminal is in a non-full-screen display state or the mobile terminal is in a full-screen display state but currently displayed information of a location where the status bar of the mobile terminal is located does not comprise preset information, control the content of the notification message to be displayed in the form of bullet comments at the location where the status bar of the mobile terminal is located;

a second prompting unit, configured to: in a case that the notification message is the first type of message, the mobile terminal is in a full-screen display state and currently displayed information of a location where the status bar of the mobile terminal is located comprises preset information, control the content of the notification message to be displayed in the form of bullet comments at other area of the display screen of the mobile terminal other than the floating notification display area.

Further, in the embodiments of the present disclosure, the second prompting sub-module 8042 includes:

a third prompting unit, configured to: in a case that the notification message is the second type of message, and the mobile terminal is in a non-full-screen display state or the mobile terminal is in a full-screen display state but there is a continuous blank area at a location where the status bar of the mobile terminal is located, control, the icon of the application to which the notification message belongs, to be displayed in a floating manner for a preset period of time on the blank area at the location where the status bar is located; or, a fourth prompting unit, configured to: in a case that the notification message is the second type of message, the mobile terminal is in a full-screen display state and there is no continuous blank area at a location where the status bar of the mobile terminal is located, control, the icon of the application to which the notification message belongs, to be displayed in a floating manner for a preset period of time on other area of the display screen of the mobile terminal other than the floating notification display area.

The mobile terminal provided by the embodiments of the present disclosure can implement various processes implemented by the mobile terminal in the method embodiments of FIG. 1 to FIG. 7, and to avoid repetition, details are not described herein again.

In summary, in the above embodiments of the present disclosure, when the floating notification display area of the display screen of the mobile terminal is in the operated state or the to-be-operated state, and if the notification message is received and needs to be prompted, the target prompting manner corresponding to the notification message is determined based on the notification message, and the notification message is prompted with the target prompting manner. The target prompting manner includes displaying the content of the notification message in the form of bullet comments and displaying in a floating manner an icon of an application to which the notification message belongs. Without disturbing the transaction currently processed by the user, the notification message can be displayed or the user can be reminded that a new message arrives based on the method, which improves the user experience; in addition, different notification display forms can be shown, which further improves the user experience.

It should be noted that the mobile terminal provided by the embodiments of the present disclosure is a mobile terminal capable of executing the method for prompting the notification message described above, so all the embodiments of the method for prompting the notification message described above are applicable to the mobile terminal, and the same or similar beneficial effects can be achieved.

Figure 10:
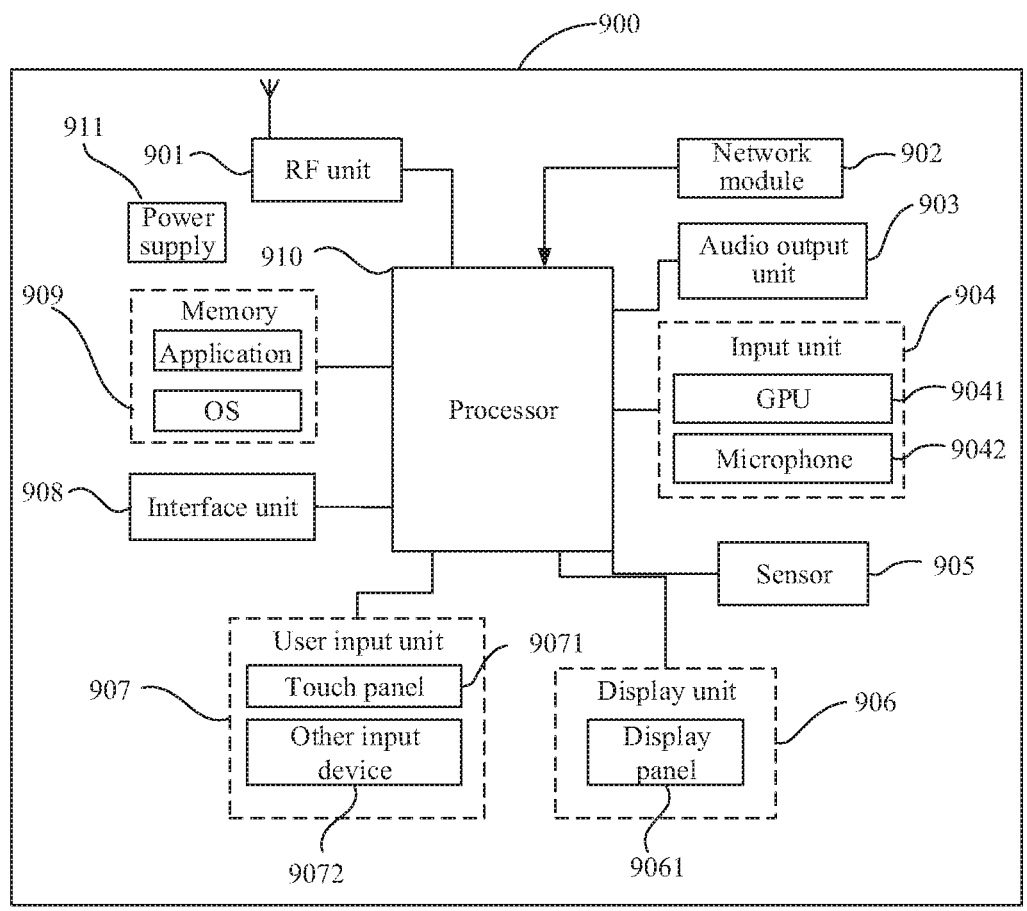
FIG. 10 is a third structural schematic diagram of a mobile terminal provided by embodiments of the present disclosure.

FIG. 10 is a schematic diagram of a hardware structure of a mobile terminal implementing various embodiments of the present disclosure.

The mobile terminal 900 includes, but is not limited to, a radio frequency unit 901, a network module 902, an audio output unit 903, an input unit 904, a sensor 905, a display unit 906, a user input unit 907, an interface unit 908, a memory 909, a processor 910, and a power supply 911, etc. Those skilled in the art can understand that the structure of the mobile terminal shown in FIG. 10 does not constitute a limitation to the mobile terminal, and the mobile terminal may include more or fewer components than those shown in the figure, or have some components combined, or use a different arrangement of the components. In the embodiments of the present disclosure, the mobile terminal includes, but is not limited to, a mobile phone, a tablet computer, a notebook computer, a palmtop computer, a vehicle-mounted terminal, a wearable device, a pedometer, or the like.

The radio frequency unit 901 is configured to receive a notification message;

The processor 910 is configured to determine whether a floating notification display area of a display screen of the mobile terminal is in an operated state or a to-be-operated state; where the floating notification display area is an area whose distance from a status bar of the mobile terminal is less than or equal to a target value; determine whether the notification message needs to be prompted, in a case that the floating notification display area is in the operated state or the to-be-operated state; and prompt the notification message by using a target prompting manner corresponding to the notification message, in a case that the notification message needs to be prompted.

In summary, in the above embodiments of the present disclosure, when the floating notification display area of the display screen of the mobile terminal is in the operated state or the to-be-operated state, and if the notification message is received and needs to be prompted, the target prompting manner corresponding to the notification message is determined based on the notification message, and the notification message is prompted with the target prompting manner. The target prompting manner includes displaying the content of the notification message in the form of bullet comments and displaying an icon of an application to which the notification message belongs in a floating manner. Without disturbing the transaction currently processed by the user, the notification message can be displayed or the user can be reminded that a new message arrives based on the method, which improves the user experience; in addition, different notification display forms can be shown, which further improves the user experience.

It should be noted that the mobile terminal provided by the embodiments of the present disclosure is a mobile terminal capable of executing the method for prompting the notification message described above, so all the embodiments of the method for prompting the notification message described above are applicable to the mobile terminal, and the same or similar beneficial effects can be achieved.

It should be understood that, in the embodiments of the present disclosure, the radio frequency unit 901 may be configured to receive and send information, or to receive and send signals in a call. Specifically, the radio frequency unit 901 delivers the downlink information received from a base station to the processor 910; and transmits the uplink data to the base station. Generally, the radio frequency unit 901 includes, but is not limited to, an antenna, at least one amplifier, a transceiver, a coupler, a low noise amplifier, a duplexer, or the like. In addition, the radio frequency unit 901 may communicate with a network or other devices via a wireless communication system.

The mobile terminal provides users with wireless broadband Internet access via the network module 902, such as helping users send and receive emails, browse web pages and access streaming media.

The audio output unit 903 may convert audio data received by the radio frequency unit 901 or the network module 902 or stored in the memory 909 into audio signals and output them as sound. Moreover, the audio output unit 903 may provide audio output (for example, call signal reception sound, message reception sound, etc.) related to a specific function performed by the mobile terminal 900. The audio output unit 903 includes a speaker, a buzzer, a receiver, or the like.

The input unit 904 is configured to receive audio or video signals. The input unit 904 may include a graphics processing unit (GPU) 9041 and a microphone 9042. The graphics processor 9041 is configured to process image data of still pictures or videos obtained via an image capture device (such as a camera) in an image capture mode or a video capture mode. The processed image frames may be displayed on the display unit 906. The image frames processed by the graphics processor 9041 may be stored in the memory 909 (or other storage medium) or transmitted via the radio frequency unit 901 or the network module 902. The microphone 9042 may receive sound, and may process the sound into audio data. The processed audio data may be converted into a format that can be transmitted to a mobile communication base station for outputting via the radio frequency unit 901 in the case of a telephone call mode.

The mobile terminal 900 further includes at least one sensor 905, such as an optical sensor, a motion sensor, or other sensors. Specifically, the optical sensor includes an ambient light sensor and a proximity sensor. The ambient light sensor may adjust brightness of the display panel 9061 according to the brightness of the ambient light, and the proximity sensor may close the display panel 9061 and/or backlight when the mobile terminal 900 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the mobile terminal (such as switching of horizontal and vertical screen, a correlated game, magnetometer pose calibration), a function about vibration recognition (such as pedometer, tapping). The sensor 905 may also include a fingerprint sensor, a pressure sensor, an iris sensor, a molecular sensor, a gyroscope, a barometer, a hygrometer, a thermometer, an infrared sensor, or the like, which are not described herein.

The display unit 906 is configured to display information input by the user or information provided for the user. The display unit 906 may include a display panel 9061. The display panel 9061 may be configured in the form of a liquid crystal display (LCD), an organic light-emitting diode (OLED), or the like.

The user input unit 907 may be configured to receive inputted numeric or character information, and generate key signal inputs related to user settings and function control of the mobile terminal. Specifically, the user input unit 907 includes a touch panel 9071 and other input device 9072. The touch panel 9071, also known as a touch screen, may collect a touch operation of a user thereon or thereby (for example, an operation on or around the touch panel 9071 that is made by a user with a finger, a touch pen or any other suitable object or accessory). The touch panel 9071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 910. The touch controller may receive a command from by the processor 910 and executes the command. In addition, the touch panel 9071 may be implemented by various types such as a resistive panel, a capacitive panel, an infrared panel, or a surface acoustic wave panel. In addition to the touch panel 9071, the user input unit 907 may include other input device 9072. Specifically, the other input device 9072 may include, but is not limited to, a physical keyboard, a function key (such as a volume control key, a switch key), a trackball, a mouse, or a joystick, which are not described herein.

Further, the display panel 9061 may be covered by the touch panel 9071. When the touch panel 9071 detects a touch operation on or near the touch panel 9071, the touch panel 9071 transmits the touch operation to the processor 910 to determine the type of the touch event, and the processor 910 provides a corresponding visual output on the display panel 9061 according to the type of touch event. Although the touch panel 9071 and the display panel 9061 are implemented as two independent components to implement the input and output functions of the mobile terminal in FIG. 12, in some embodiments, the touch panel 9071 and the display panel 9061 may be integrated to implement the input and output functions of the mobile terminal, which are not limited herein.

The interface unit 908 is an interface through which an external device is connected to the mobile terminal 900. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 908 may be configured to receive input (e.g., data information, power, etc.) from an external device and transmit the received input to one or more elements in the mobile terminal 900 or may be configured to transmit data between the mobile terminal 900 and the external device.

The memory 909 may be configured to store software programs and various data. The memory 909 may mainly include a program storage area and a data storage area, where the program storage area may store an operating system, an application (such as a sound playback function, an image playback function, etc.) required for at least one function; the data storage area may store data (such as audio data, a phone book, etc.) created according to the use of the mobile phone. In addition, the memory 909 may include a high-speed random access memory, and may further include a non-volatile memory, such as at least one magnetic disk storage device, a flash memory device, or other volatile solid-state storage device.

The processor 910 is a control center of the mobile terminal, which uses various interfaces and lines to connect various parts of the entire mobile terminal. The processor 910 runs or executes software programs and/or modules stored in the memory 909 and calls data stored in the memory 909, to execute various functions of the mobile terminal and process data, so as to monitor the mobile terminal as a whole. The processor 910 may include one or more processing units. Optionally, the processor 910 may integrate an application processor and a modem processor. The application processor mainly processes an operating system, a user interface, an application, etc., and the modem processor mainly processes wireless communications. It can be understood that the foregoing modem processor may not be integrated into the processor 910.

The mobile terminal 900 may further include a power supply 911 (such as a battery) for supplying power to various components. Optionally, the power supply 911 may be logically connected to the processor 910 through a power management system, so as to implement functions, such as management of charging and discharging, and power consumption management, via the power management system.

In addition, the mobile terminal 900 may include some functional modules that are not shown, which are not described herein again.

Figure 11:
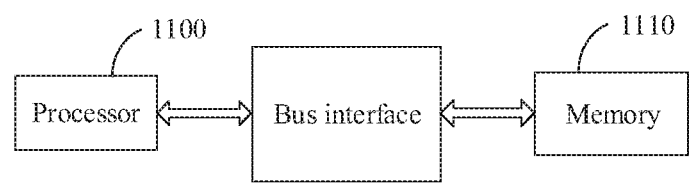
FIG. 11 is a fourth structural schematic diagram of a mobile terminal provided by embodiments of the present disclosure.

Optionally, as shown in FIG. 11, embodiments of the present disclosure further provide a mobile terminal, which includes a processor 1100, a memory 1110, and a computer program stored on the memory 1110 and executable by the processor 1100. When the computer program is executed by the processor 1100, the various processes of the embodiments of the above method are implemented, which can achieve the same technical effects. To avoid repetition, details are not described herein.

Embodiments of the present disclosure further provide a computer readable storage medium. A computer program is stored on the computer readable storage medium. When the computer program is executed by a processor, the various processes of the embodiments of the above method are implemented, which can achieve the same technical effects. To avoid repetition, details are not described herein. The computer readable storage medium is, for example, a read-only memory (ROM), a random access memory (RAM), a magnetic disk or an optical disk.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the conventional technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described in the above with reference to the accompanying drawings, and the present disclosure is not limited to the specific implementations described above. The specific implementations described above are merely schematic and are not restrictive. Those skilled in the art at the inspiration of the present disclosure can obtain many forms without departing from the spirit of the present disclosure and the protection scope of the claims, which all fall within the protection of the present disclosure.

The above descriptions merely illustrate some specific implementations of the present disclosure, and the protection scope of the present disclosure is not limited thereto. Any modification or substitution made by those skilled in the art without departing from the technical scope of the present disclosure shall fall within the protection scope of the present disclosure. Therefore, the protection scope of the present disclosure is determined by the protection scope of the claims.

What is claimed is:

1. A method for prompting a notification message, applied to a mobile terminal, comprising:
   receiving a notification message;
   determining whether a floating notification display area of a display screen of the mobile terminal is in an operated state or a to-be-operated state, wherein the floating notification display area is an area whose distance from a status bar of the mobile terminal is less than or equal to a target value;
   determining whether the notification message needs to be prompted, in a case that the floating notification display area is in the operated state or the to-be-operated state; and
   prompting the notification message by using a target prompting manner corresponding to the notification message, in a case that the notification message needs to be prompted;
   wherein the prompting the notification message by using the target prompting manner corresponding to the notification message comprises:

controlling content of the notification message to be displayed in a form of bullet comments at a first target location of the display screen of the mobile terminal, in a case that the notification message is a first type of message, wherein the bullet comments are non-clickable; and controlling, an icon of an application to which the notification message belongs, to be displayed at a second target location of the display screen of the mobile terminal, in a case that the notification message is a second type of message.

2. The method according to claim 1, wherein the determining whether the floating notification display area of the display screen of the mobile terminal is in the operated state or the to-be-operated state comprises:

determining whether the floating notification display area of the display screen of the mobile terminal is in the operated state or the to-be-operated state, according to a historical touch track of a user of the mobile terminal on the display screen; and/or, determining whether the floating notification display area of the display screen of the mobile terminal is in the operated state or the to-be-operated state, according to a gesture of the user of the mobile terminal for holding the mobile terminal; and/or, determining whether the floating notification display area of the display screen of the mobile terminal is in the operated state or the to-be-operated state, according to pupil gaze information of the user of the mobile terminal.

3. The method according to claim 2, wherein the determining whether the floating notification display area of the display screen of the mobile terminal is in the operated state or the to-be-operated state according to the gesture of the user of the mobile terminal for holding the mobile terminal comprise:

in a case that the gesture of the user of the mobile terminal for holding the mobile terminal indicates that the user of the mobile terminal is capable of touching the floating notification display area, determining that the floating notification display area is in the operated state or the to-be-operated state; otherwise, determining that the floating notification display area is not in the operated state or the to-be-operated state.

4. The method according to claim 2, wherein the determining whether the floating notification display area of the display screen of the mobile terminal is in the operated state or the to-be-operated state according to the pupil gaze information of the user of the mobile terminal comprises:

in a case that an area where the pupil of the user of the mobile terminal gazes overlaps with the floating notification display area, determining that the floating notification display area is in the operated state or the to-be-operated state; otherwise, determining that the floating notification display area is not in the operated state or to-be-operated state.

5. The method according to claim 1, wherein the determining whether the notification message needs to be prompted comprises:

in a case that the notification message is a third type of message, determining that the notification message does not need to be prompted; otherwise, determining that the notification message needs to be prompted.

6. The method according to claim 1, wherein, in a case that the notification message is the first type of message, controlling the content of the notification message to be displayed in the form of bullet comments at the first target location of the display screen of the mobile terminal comprises:

in a case that the notification message is the first type of message, and the mobile terminal is in a non-full-screen display state or the mobile terminal is in a full-screen display state but currently displayed information of a location where the status bar of the mobile terminal is located does not comprise preset information, controlling the content of the notification message to be displayed in the form of bullet comments at the location where the status bar of the mobile terminal is located; or, in a case that the notification message is the first type of message, the mobile terminal is in a full-screen display state and currently displayed information of a location where the status bar of the mobile terminal is located comprises preset information, controlling the content of the notification message to be displayed in the form of bullet comments at other area of the display screen of the mobile terminal other than the floating notification display area.

7. The method according to claim 1, wherein, in a case that the notification message is the second type of message, controlling, the icon of the application to which the notification message belongs, to be displayed at the second target location of the display screen of the mobile terminal comprises:

in a case that the notification message is the second type of message, and the mobile terminal is in a non-full-screen display state or the mobile terminal is in a full-screen display state but there is a continuous blank area at a location where the status bar of the mobile terminal is located, controlling, the icon of the application to which the notification message belongs, to be displayed in a floating manner for a preset period of time on the blank area at the location where the status bar is located; or, in a case that the notification message is the second type of message, the mobile terminal is in a full-screen display state and there is no continuous blank area at a location where the status bar of the mobile terminal is located, controlling, the icon of the application to which the notification message belongs, to be displayed in a floating manner for a preset period of time on other area of the display screen of the mobile terminal other than the floating notification display area.

8. A mobile terminal, comprising a processor, a memory, and a program stored on the memory and executable by the processor, wherein the processor is configured to execute the program to:

receive a notification message;

determine whether a floating notification display area of a display screen of the mobile terminal is in an operated state or a to-be-operated state, wherein the floating notification display area is an area whose distance from a status bar of the mobile terminal is less than or equal to a target value;

determine whether the notification message needs to be prompted in a case that the floating notification display area is in the operated state or the to-be-operated state; and prompt the notification message by using a target prompting manner corresponding to the notification message in a case that the notification message needs to be prompted;

wherein the processor is configured to:

control content of the notification message to be displayed in a form of bullet comments at a first target location of the display screen of the mobile terminal, in a case that the notification message is a first type of message, wherein the bullet comments are non-clickable; and control, an icon of an application to which the notification message belongs, to be displayed at a second target location of the display screen of the mobile terminal, in a case that the notification message is a second type of message.

9. The mobile terminal according to claim 8, wherein the processor is configured to:

determine whether the floating notification display area of the display screen of the mobile terminal is in the operated state or the to-be-operated state according to a historical touch track of a user of the mobile terminal on the display screen; and/or, determine whether the floating notification display area of the display screen of the mobile terminal is in the operated state or the to-be-operated state according to a gesture of the user of the mobile terminal for holding the mobile terminal; and/or, determine whether the floating notification display area of the display screen of the mobile terminal is in the operated state or the to-be-operated state according to pupil gaze information of the user of the mobile terminal.

10. The mobile terminal of claim 9, wherein the processor is configured to:

in a case that the gesture of the user of the mobile terminal for holding the mobile terminal indicates that the user of the mobile terminal is capable of touching the floating notification display area, determine that the floating notification display area is in the operated state or the to-be-operated state; otherwise, determine that the floating notification display area is not in the operated state or the to-be-operated state.

11. The mobile terminal of claim 9, wherein the processor is configured to:

in a case that an area where a pupil of the user of the mobile terminal gazes overlaps with the floating notification display area, determine that the floating notification display area is in the operated state or the to-be-operated state; otherwise, determine that the floating notification display area is not in the operated state or to-be-operated state.

12. The mobile terminal of claim 8, wherein the processor is configured to:

in a case that the notification message is a third type of message, determine that the notification message does not need to be prompted; otherwise, determine that the notification message needs to be prompted.

13. The mobile terminal of claim 8, wherein the processor is configured to:

in a case that the notification message is the first type of message, and the mobile terminal is in a non-full-screen display state or the mobile terminal is in a full-screen display state but currently displayed information of a location where the status bar of the mobile terminal is located does not comprise preset information, control the content of the notification message to be displayed in the form of bullet comments at the location where the status bar of the mobile terminal is located; or, in a case that the notification message is the first type of message, the mobile terminal is in a full-screen display state and currently displayed information of a location where the status bar of the mobile terminal is located comprises preset information, control the content of the notification message to be displayed in the form of bullet comments at other area of the display screen of the mobile terminal other than the floating notification display area.

14. The mobile terminal according to claim 8, wherein the processor is configured to:

in a case that the notification message is the second type of message, and the mobile terminal is in a non-full-screen display state or the mobile terminal is in a full-screen display state but there is a continuous blank area at a location where the status bar of the mobile terminal is located, control, the icon of the application to which the notification message belongs, to be displayed in a floating manner for a preset period of time on the blank area at the location where the status bar is located; or, in a case that the notification message is the second type of message, the mobile terminal is in a full-screen display state and there is no continuous blank area at a location where the status bar of the mobile terminal is located, control, the icon of the application to which the notification message belongs, to be displayed in a floating manner for a preset period of time on other area of the display screen of the mobile terminal other than the floating notification display area.

15. A non-transitory computer-readable storage medium, having a program stored thereon, wherein, when the program is executed by a processor, steps of the method according to claim 1 are implemented.

16. The non-transitory computer-readable storage medium according to claim 15, wherein the determining whether the floating notification display area of the display screen of the mobile terminal is in the operated state or the to-be-operated state comprises:

determining whether the floating notification display area of the display screen of the mobile terminal is in the operated state or the to-be-operated state, according to a historical touch track of a user of the mobile terminal on the display screen; and/or, determining whether the floating notification display area of the display screen of the mobile terminal is in the operated state or the to-be-operated state, according to a gesture of the user of the mobile terminal for holding the mobile terminal; and/or, determining whether the floating notification display area of the display screen of the mobile terminal is in the operated state or the to-be-operated state, according to pupil gaze information of the user of the mobile terminal.

17. The non-transitory computer-readable storage medium according to claim 16, wherein the determining whether the floating notification display area of the display screen of the mobile terminal is in the operated state or the to-be-operated state according to the gesture of the user of the mobile terminal for holding the mobile terminal comprise:

in a case that the gesture of the user of the mobile terminal for holding the mobile terminal indicates that the user of the mobile terminal is capable of touching the floating notification display area, determining that the floating notification display area is in the operated state or the to-be-operated state; otherwise, determining that the floating notification display area is not in the operated state or the to-be-operated state.

18. The non-transitory computer-readable storage medium according to claim 16, wherein the determining whether the floating notification display area of the display screen of the mobile terminal is in the operated state or the to-be-operated state according to the pupil gaze information of the user of the mobile terminal comprises:
in a case that an area where the pupil of the user of the mobile terminal gazes overlaps with the floating notification display area, determining that the floating notification display area is in the operated state or the to-be-operated state; otherwise, determining that the floating notification display area is not in the operated state or to-be-operated state.

19. The non-transitory computer-readable storage medium according to claim 15, wherein the determining whether the notification message needs to be prompted comprises:
in a case that the notification message is a third type of message, determining that the notification message does not need to be prompted; otherwise, determining that the notification message needs to be prompted.

20. The non-transitory computer-readable storage medium according to claim 15, wherein, in a case that the notification message is the first type of message, controlling the content of the notification message to be displayed in the form of bullet comments at the first target location of the display screen of the mobile terminal comprises:
in a case that the notification message is the first type of message, and the mobile terminal is in a non-full-screen display state or the mobile terminal is in a full-screen display state but currently displayed information of a location where the status bar of the mobile terminal is located does not comprise preset information, controlling the content of the notification message to be displayed in the form of bullet comments at the location where the status bar of the mobile terminal is located; or,
in a case that the notification message is the first type of message, the mobile terminal is in a full-screen display state and currently displayed information of a location where the status bar of the mobile terminal is located comprises preset information, controlling the content of the notification message to be displayed in the form of bullet comments at other area of the display screen of the mobile terminal other than the floating notification display area.

\* \* \* \* \*